March 1, 1966   G. H. ODOM   3,237,900
LEVEL WINDING MECHANISM FOR FISHING REELS
Filed March 13, 1964   3 Sheets-Sheet 1

INVENTOR.
GEORGE H. ODOM
BY M. N. Chears
Attorney

March 1, 1966  G. H. ODOM  3,237,900
LEVEL WINDING MECHANISM FOR FISHING REELS
Filed March 13, 1964  3 Sheets-Sheet 3

INVENTOR.
GEORGE H. ODOM
BY
M. N. Cheairs
Attorney

United States Patent Office 3,237,900
Patented Mar. 1, 1966

3,237,900
LEVEL WINDING MECHANISM FOR FISHING REELS
George H. Odom, 208 Tuna, Galveston, Tex.
Filed Mar. 13, 1964, Ser. No. 351,764
14 Claims. (Cl. 242—84.43)

The present invention relates to fishing reels. More particularly, the present invention relates to a new and improved level winding mechanism for casting fishing reels.

Level winding mechanisms may be placed in either of two rather general classifications. The first classification includes those level winding mechanisms which are directly driven by and reciprocably moved by rotation of a double ended worm, also known as a right and left screw threaded shaft, which is activated by rotation of the spool of the reel to which the worm is connected by means of an arrangement of gears. Such level winding mechanisms are in continuous action during casting, being in motion while line is paying out as well as when the line is being wound back onto the spool of the reel. This type of level winding mechanism causes unnecessary wear on the parts of the level winding mechanism because of the continuous motion of the level winding mechanism during casting out and winding in of the fishing line. Also, because of its more complex arrangement of working mechanical parts, this type of level winding mechanism is subject to an increased possibility of mechanical breakdown. Further, since this type of level winding mechanism must operate when a cast is made, the distance of the cast is significantly reduced. A particular disadvantage of level winding mechanisms of this classification results from the use of such mechanisms in salt water fishing. In such utility, the continuous casting out and winding in of the fishing line results in the deposition of salt and fine particles of silt on all parts of the level winding mechanism which because of the continuous action of the level winding mechanism results in an early failure of the mechanism. Further, as the level winding mechanism becomes coated with the salt and silt deposit, its movement becomes sluggish thus causing poor casting and, in many instances, backlash.

The second classification or type of level winding mechanism is that in which the level winding mechanism is not connected to the action of the spool of the fishing reel other than by the fishing line. Level winding mechanisms of this type are not driven by rotation of a double ended worm connected by gears to the spool of the reel but rather have a fixed double ended worm upon which rotates a wheel having a peripheral groove adapted to receive fishing line and be rotated by the friction produced by the line passing through the peripheral groove. Such level winding attachments are often manually rotated out of the line of movement of the fishing line while line is paying out from the reel during casting and are rotated into use only on winding in of the line. Three significant disadvantages have been found in the use of these prior art mechanisms. First, the necessity of rotating the level winding mechanism in and out of position is inconvenient and provides another point of potential mechanical failure. Second, these mechanisms do not provide adequate guide means for positioning the fishing line in the peripheral groove of the rotating wheel. A third disadvantage is found in the lack of adequate means for preventing the fouling of the fishing line around and with the grooved rotating wheel.

It is an object of the present invention to provide a new and improved level winding means for fishing reels. Another object of the present invention is to provide a new and improved level winding means as an integral part of a fishing reel or as a removable attachment for a fishing reel. A particular object of the present invention is to provide a new and improved level winding means which avoids unnecessary wear of the level winding mechanism itself. Another particular object of the present invention is to provide a new and improved level winding means having a minimum of movable parts thereby reducing the possibility of mechanical failure. Yet another particular object of the present invention is to provide a new and improved level winding means with which the possibility of the fishing line becoming fouled in the level winding mechanism is substantially alleviated. It is also an object of the present invention to provide a new and improved level winding means which does not impede casting or retard the speed of the fishing line on casting out the line. Another object of the present invention is to provide a new and improved level winding means having a substantially improved means of guiding the fishing line onto the spool of the reel. Additional objects will become apparent from the following description of the invention herein disclosed.

The present invention, in one of its embodiments, comprises a fishing reel providing for level winding of fishing line which comprises a fixed reel frame having a spool rotatably mounted therein, a level winding means comprising a frame rigidly affixed to said reel frame, a non-rotatable right and left screw threaded traversing shaft mounted in said frame and substantially parallel with the axis of said spool, a wheel reciprocably mounted on said traversing shaft said wheel adapted to engage frictionally with fishing line, a non-rotatable guide means connected for reciprocatory movement by and with said wheel including two line guide members having overlapping projections projecting inwardly to overlap the outer peripheral edges of said wheel to form a slot over the center peripheral edge of said wheel, said line guide members diverging from said overlapping projections, said diverging line guide members being united at their extremities by an arcuate portion of said members, thereby forming a loop having substantially the shape of a segment of a circle with the apex at the slot formed by said overlapping projections, said line guide members being united in front of and to the rear of said wheel at a point just below the tangent described by the fishing line in contact with said wheel.

In another embodiment, the present invention comprises a level winding mechanism as described above detachably mounted on a conventional fishing reel as an attachment thereto rather than as an integral part thereof. The level winding mechanism may be attached to the fishing reel by any clamping means but preferably is attached by a snap on arrangement more fully described hereinafter. This snap on arrangement provides for much easier and simpler attachment and detachment of the level winding mechanism to and from the fishing reel.

In order to more fully describe, as well as to illustrate the present invention, reference will be made to the accompanying drawings which show various embodiments and details of the present invention.

Figure 4:
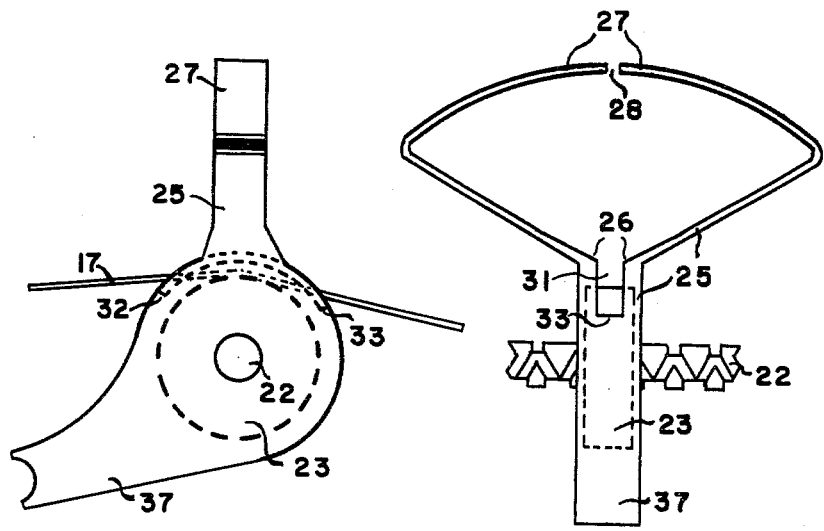
Figure 5:
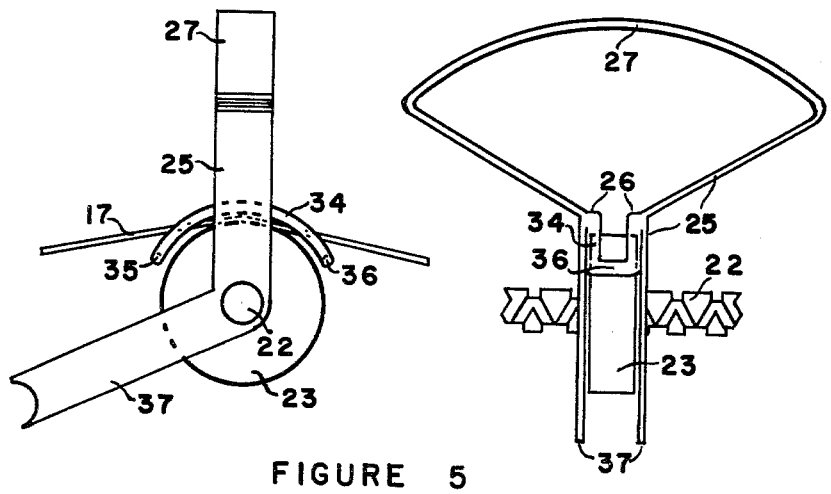

FIGURES 4 and 5 each present a side and front elevational view of a detail illustrating two different embodiments of the present invention.

In the drawings, like characters are used throughout the drawings to designate corresponding parts. To describe the drawings, fishing reel 10 is shown mounted on a usual fishing rod 11. Fishing reel 10 is provided with reel seat plate 12 which is secured in position on fishing rod 11 by a pair of usual ring-type clamping members 13 which fit over the ends of the reel seat plate 12 to rigidly secure fishing reel 10 to fishing rod 11.

Fishing reel 10 comprises a reel frame formed by end plates 14 which are connected by and maintained in a spaced relation by a plurality of pillars or connecting bars 15. Within the reel frame, a spool 16 is disposed between end plates 14 upon which fishing line 17 is adapted to be wound. A crank which is not shown is connected for rotatable movement, exteriorly of end plates 14, on an end of crank shaft 18 and is operatively connected to line carrying spool 16 by direct means through crank shaft 18 or through conventional gearing arrangements whereby it is adapted to rotate spool 16 to reel in the fishing line. The fishing reel of the present invention is not to be limited to any particular arrangement of pillars or connecting bars 15 or to be limited to any particular size or shape of its components. Any fishing reel embodying spaced end elements joined by pillars or connecting bars and having disposed therein a rotatably mounted spool for receiving fishing line may be used in effectuating the objects and purposes of the present invention.

Figure 2:
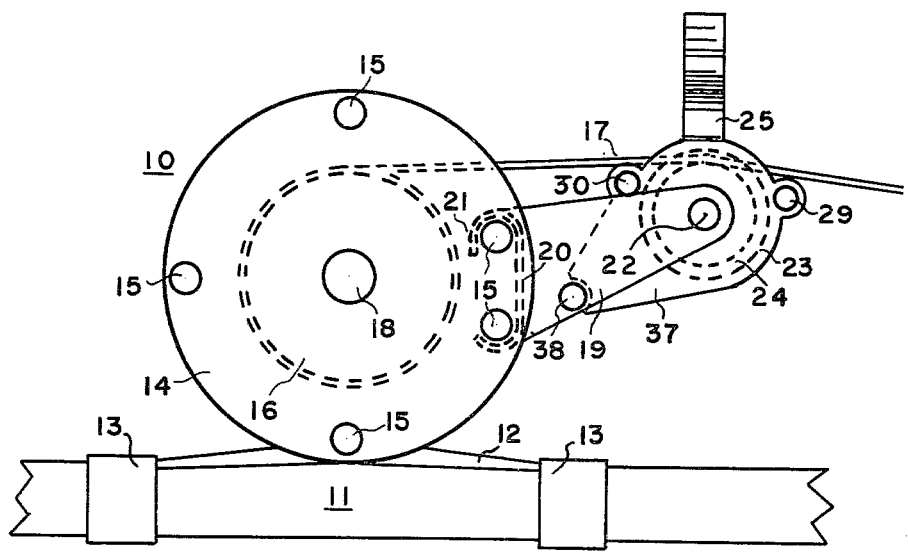
FIGURE 2 is a side elevational view of a fishing reel having the level winding mechanism of the present invention detachably mounted thereon.

In the embodiment of the present invention illustrated by FIGURE 2, the fishing reel is one having a pair of pillars or connecting bars 15 joining end plates 14 adjacent the front edge of these end plates substantially as illustrated in this figure. Such location of the pair of pillars 15 greatly facilitates attachment and detachment of the level winding mechanism of the present invention when it is detachably mounted on the reel frame of the fishing reel.

Figure 1:
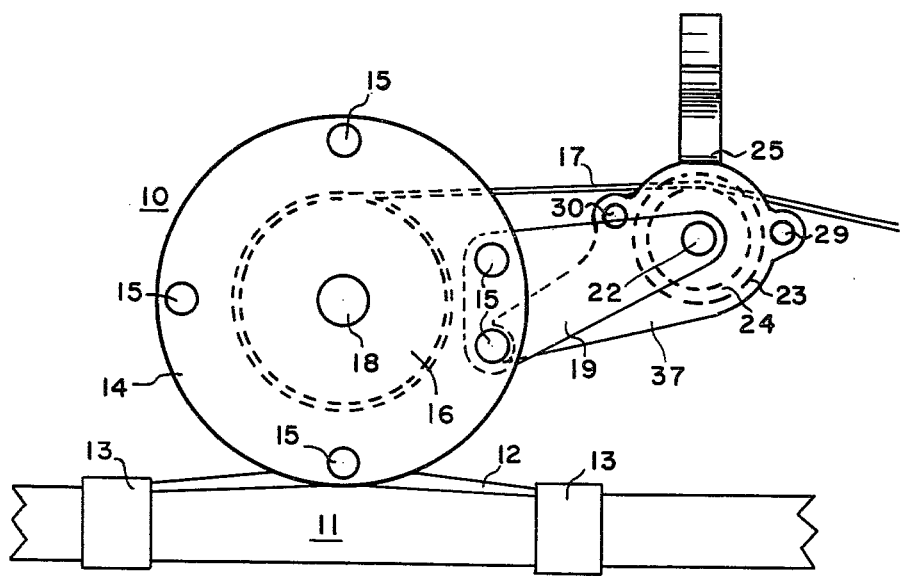
FIGURE 1 is a side elevational view of a level winding fishing reel embodying the new and improved level winding mechanism of the present invention as an integral part thereof.
Figure 3:
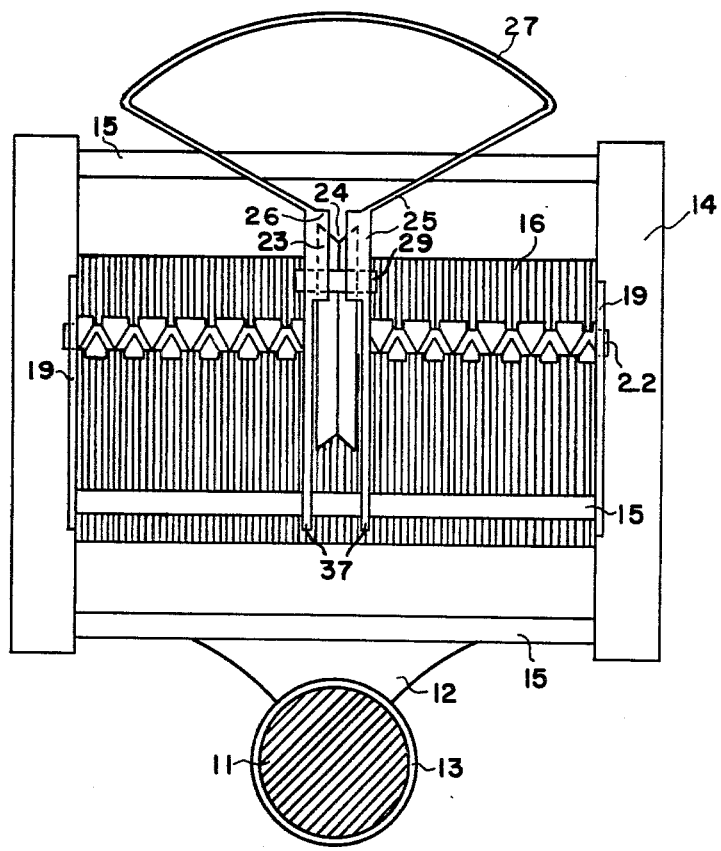
FIGURE 3 is a front elevational view of the level winding fishing reel of FIGURE 1.

The level winding mechanism of the present invention includes a mounting frame which comprises two arms 19 which extend forward from the fishing reel 10 at substantially right angles to the axis of spool 16 and substantially parallel to the axis of fishing rod 11. Arms 19 may be rigidly attached to end plates 14 as illustrated by FIGURES 1 and 3 or to the pillars 15 connecting end plates 14. The present invention is not to be limited to either of these suggested methods of non-detachably affixing arms 19 to the reel frame since other similar methods of so attaching arms 19 may be used without departing from the spirit and scope of the present invention.

In the embodiment of the present invention wherein the level winding mechanism is detachably mounted on a fishing reel, illustrated in FIGURE 2, the mounting frame comprises in addition to arms 19 a base plate 20. In this embodiment, arms 19 are connected at substantially right angles, one at each end, to the ends of base plate 20. Base plate 20 usually provides a clamping means for detachable attachment to fishing reel 10, generally, to a pair of pillars or connecting bars 15. Preferably, the clamping means comprises a snap on arrangement as illustrated in FIGURE 2 wherein the upper edge of base plate 20 is curved in a semi-circular fashion in the direction of spool 16 to form a lip 21 which fits snugly over the upper connecting bar of the pair of connecting bars 15 and wherein the lower edge of base plate 20 is bent in the same general direction as the upper edge but to a lesser extent such that when the upper edge of the base plate 20 is snugly fitted above and around the upper connecting bar of the pair of connecting bars 15, the bent lower edge will just pass under the lower bar of said pair of connecting bars 15 and thereby securely snap the level winding mechanism in place on the reel frame. This snap on method of detachably mounting the level winding mechanism of the present invention on the fishing reel is but a preferred method and is therefore not limiting to the present invention. Any method of mounting the level winding mechanism on the reel frame which permits detachment of the level winding mechanism may be used without departing from the spirit or scope of the present invention.

Rigidly supported by arms 19 of the mounting frame and connecting said arms 19 is a non-rotatable right and left screw threaded traversing shaft 22 which is disposed substantially parallel to the axis of spool 16. Rotatably carried by traversing shaft 22 is an annular or wheel element 23 which affects a line guide means. Wheel 23 may have a peripheral groove 24 provided therein which is adapted to accommodate fishing line 17. However, it is a particular feature of the present invention that a peripheral groove is not necessary to wheel 23. Wheel 23 may have a flat periphery, either smooth or roughened, or have a friction producing coating on its periphery rather than a peripheral groove. The lack of necessity for a peripheral groove in wheel 23 is more fully discussed hereinafter. Within the bore of wheel 23, a projection, not shown, is provided whereby wheel 23 operatively engages the threads of traversing shaft 22 such that as wheel 23 is caused to rotate it is simultaneously reciprocated back and forth along the axis of traversing shaft 22 and in a plane parallel to the axis of spool 16. Thus, as fishing line 17 is pulled across the periphery of wheel 23 thereby causing wheel 23 to rotate and reciprocate along traversing shaft 22, the fishing line is thereby caused to be uniformly wrapped in even layers without tangling around spool 16 throughout the entire length of the spool.

To guide fishing line 17 into contact with the periphery of wheel 23, a non-rotatable guide member is provided. This non-rotatable guide member includes two side plates or line guide members 25 which extend in a substantially vertical manner from the traversing shaft 22 and are sleeved onto the traversing shaft 22, one on either side of wheel 23, in a manner such that they are connected for reciprocatory movement by and with wheel 23. Line guide members 25 are provided with overlapping projections 26 which project inwardly to overlap the upper outer peripheral edges of wheel 23. The overlapping projections 26 serve to guide fishing line 17 into contact with the periphery of wheel 23 and to prevent fishing line 17 from slipping over peripheral edges of wheel 23 and becoming entangled between the outer sides of said wheel and the inner edges of line guide members 25 or traversing shaft 22. Preferably, overlapping projections 26 overlap the outer peripheral edges of wheel 23 parallel to the peripheral edges, both toward the front and toward the rear, to a point below the tangent described by fishing line 17, under conditions of normal usage, in contact with the periphery of wheel 23. From the overlapping projections 26, the line guide members 25 diverge from one another in a direction which is substantially perpendicular to the long axis of fishing rod 11. The angle of divergence from vertical of line guide members 25 is usually at an angle greater than 45°, preferably 60°, but less than 90° from the vertical. At their outer extremities, the line guide members 25 are united by an arcuate portion or section 27 of these members thereby forming a loop for containing and guiding fishing line 17, the loop having substantially the shape of a segment of a circle which has as its apex the periphery of wheel 23. Generally, this loop is relatively large compared to conventional loops, preferably having a distance between the outermost extremities of line guide members 25 approximately equal to the length of traversing shaft 22 or spool 16. FIGURES 3, 4 and 5 adequately illustrate preferred shapes of this loop. In FIGURE 4, diverging line guide members 25 are substantially widened at the base of their divergence for added strength. Also, in FIGURE 4 arcuate portion 27 of line guide members 25 has a small opening or cut 28, preferably directly above wheel 23, whereby fishing line 17 may be readily introduced into the loop formed by line guide members 25. The large loop provided by the diverging line guide members 25 allows fishing line 17 to pay out rapidly on casting with a minimum of friction with the components of the loop and with the wheel 23 thereby allowing longer casts and reducing the possibility of backlash and wear on fishing line and components of the level winding mechanism.

The two line guide members 25 are joined to one another both in front of and to the rear of wheel 23 at a point just below the tangent described by fishing line 17 in contact with the periphery of wheel 23. The tangent described by fishing line 17 in contact with the periphery of wheel 23, as used herein, is relative to normal ordinary usage wherein fishing line 17 runs from spool 16 over the upper periphery of wheel 23 and then passes to and through the guides of the fishing rod. In FIGURES 1, 2 and 3, line guide members 25 are joined in front of and to the rear of wheel 23 by means of connecting rods 29 and 30, respectively, which are parallel to traversing shaft 22. FIGURES 4 and 5 illustrate a non-rotatable guide member wherein line guide members 25 are joined in front of and to the rear of wheel 23 by extensions of themselves such that the non-rotatable guide member is a single continuous unit. FIGURE 4 illustrates particularly, a non-rotatable guide member which substantially encloses wheel 23 with the exception that a slot 31 is provided in the non-rotatable guide member directly above the center of the periphery of wheel 23 whereby fishing line 17 may contact the periphery of wheel 23. In this embodiment, the ends 32 and 33 of slot 31 are just below the tangent formed by fishing line 17 in contact with the periphery of wheel 23. FIGURE 5 presents another and similar embodiment in principle to that of FIGURE 4 but instead of wheel 23 being enclosed as in FIGURE 4 it is almost entirely unenclosed. In FIGURE 5, heavy wire or similar material 34 is united with the inner surface of line guide members 25 as an extension thereof and formed to overlap and parallel the upper outer peripheral edges of wheel 23 both to the front and to the rear of said wheel to a point just below the tangent described by fishing line 17 in contact with the periphery of wheel 23 at which point these extensions of the line guide members 25 are united by segments 35 and 36 of the heavy wire or other material, the segments being substantially parallel to traversing shaft 22.

Regardless of the manner in which line guide members 25 are joined in front of and to the rear of wheel 23, the uppermost segment of the uniting means must be just below the tangent described by fishing line 17 in contact with the periphery of wheel 23 as hereinabove defined. If the uniting means be on a level with or above this tangent it will interfere with the fishing line passing through the peripheral groove of the wheel 23 or in making contact with the periphery of said wheel if no peripheral groove exists in said wheel. If the uniting means be too far below this tangent, then it will fail to serve its primary purpose which is to prevent the fishing line from slipping from the periphery of wheel 23 and becoming fouled by slipping into the crevice between the wheel 23 and the line guide members 25 or traversing shaft 22.

One of the distinguishing features of the present invention is the lack of necessity of a peripheral groove 24, shown in FIGURES 1, 2 and 3, in wheel 23. Overlapping projections 26 which overlap and parallel the upper outer peripheral edges of wheel 23 to a point just below the tangent described by the fishing line 17 in contact with the periphery of wheel 23 at which point they are united make it substantially impossible for fishing line 17 to slip over the edges of wheel 23 so as to become fouled. Thus, the necessity of peripheral groove 24 to maintain line 17 in contact with wheel 23 is alleviated. A peripheral groove 24 in wheel 23 may still be desired in the practice of the present invention, however, since it allows a greater surface contact between line 17 and wheel 23 thereby increasing the force exerted on wheel 23 by line 17.

The non-rotatable guide member is maintained in its non-rotating position by means of downward extension 37 of line guide members 25 which slidably engages one of the connecting bars 15 of the reel frame as illustrated in FIGURE 1 or a rigidly mounted cross bar 38 mounted between arms 19 substantially parallel to traversing shaft 22 as illustrated by FIGURE 2. Extension 37 slidably engages connecting bar 15 or cross bar 38 by a notch in its outer end which receives and thereby slidably engages said connecting bar or cross bar. As wheel 23 is caused to travel along traversing shaft 22 thereby causing the non-rotating guide member to travel therewith, extension 37 is caused to slide along connecting bar 15 or cross bar 38 thereby preventing the non-rotating guide member from rotating.

The present invention obviously is not limited to the embodiments or the exact form of the embodiments of the present invention shown in the drawings and described herein. Those skilled in the art will readily observe many embodiments of the present invention and modifications thereof not specifically illustrated or described, but so long as such embodiments and modifications employ elements corresponding in use and purpose to those described and shown herein to attain the objects and purposes of the present invention such embodiments and modifications are within the spirit and scope of the present invention.

What is claimed is:

1. A fishing reel providing for level winding of fishing line which comprises a fixed reel frame having a spool rotatably mounted therein, a level winding means comprising a frame rigidly affixed to said reel frame, a non-rotatable right and left screw threaded traversing shaft mounted in said frame and substantially parallel with the axis of said spool, a wheel reciprocably mounted on said traversing shaft, said wheel adapted to engage frictionally with fishing line, a non-rotatable guide means connected for reciprocatory movement by and with said wheel including two line guide members having overlapping projections projecting inwardly to overlap and parallel the outer peripheral edges of said wheel to a point substantially below the tangent described by said fishing line in contact with the periphery of said wheel to thereby form a slot over the center peripheral edge of said wheel, said line guide members diverging from said overlapping projections, said diverging line guide members being united at their extremities by an arcuate portion of said members, thereby forming a loop, said line guide members being further united in front of and to the rear of said wheel at a point just below the tangent described by the fishing line in contact with said wheel.

2. The fishing reel of claim 1 in which said line guide members diverge from said overlapping projections at an angle greater than 45° but less than 90° from the vertical, the distance between the outer extremities of said line guide members being approximately equal to the length of said traversing shaft.

3. The fishing reel of claim 1 in which said line guide members are united in front of and to the rear of said wheel by extensions of each other such that said non-rotatable guide member is a single continuous unit.

4. The fishing reel of claim 1 in which said arcuate portion of said line guide members is separated at some point along its length to facilitate introduction of said fishing line into said loop formed by said line guide members.

5. The fishing reel of claim 1 in which said overlapping projections of said line guide members overlaps and parallels the upper outer peripheral edges of said wheel to a point just below the tangent described by said fishing line in contact with the periphery of said wheel at which point said overlapping projections are united.

6. The fishing reel of claim 1 in which said non-rotatable guide member substantially encloses said wheel with the exception that a slot is provided in said non-rotatable guide member directly above the center of the periphery of said wheel whereby said fishing line may frictionally contact the center of the periphery of said wheel.

7. The fishing reel of claim 1 in which the wheel has a groove in its periphery.

8. A level winding attachment for fishing reels comprising a mounting frame including a base plate adapted to be mounted on a fishing reel, a non-rotatable right and left screw threaded traversing shaft mounted in said frame substantially parallel to said base plate, a wheel reciprocably mounted on said traversing shaft, said wheel adapted to engage frictionally with fishing line, a non-rotatable guide means connected for reciprocatory movement by and with said wheel including two line guide members having overlapping projections projecting inwardly to overlap and parallel the outer peripheral edges of said wheel to a point substantially below the tangent described by said fishing line in contact with the periphery of said wheel to thereby form a slot over the center peripheral edge of said wheel, said line guide members diverging from said overlapping projections, said diverging line guide members being united at their outer extremities by an arcuate portion of said members, thereby forming a loop, said line guide members being further united in front of and to the rear of said wheel at a point just below the tangent described by the fishing line in contact with the periphery of said wheel.

9. The level winding attachment of claim 8 in which said line guide members diverge from said overlapping projections at an angle greater than 45° but less than 90° from the vertical, the distance between the outer extremities of said line guide members being approximately equal to the length of said traversing shaft.

10. The level winding attachment of claim 8 in which said line guide members are united in front of and to the rear of said wheel by extensions of each other such that said non-rotatable guide means is a single continuous unit.

11. The level winding attachment of claim 8 in which said arcuate portion of said line guide members is separated at some point along its length to facilitate introduction of said fishing line into said loop formed by said line guide members.

12. The level winding attachment of claim 8 in which said overlapping projections of said line guide members overlaps and parallels the upper outer peripheral edges of said wheel to a point just below the tangent described by said fishing line in contact with the periphery of said wheel at which point said overlapping projections are united.

13. The level winding attachment of claim 8 in which said non-rotatable guide means substantially encloses said wheel with the exception that a slot is provided in said non-rotatable guide means directly above the center of the periphery of said wheel whereby said fishing line may frictionally contact the center of the periphery of said wheel.

14. The level winding attachment of claim 8 in which the wheel has a groove in its periphery.

References Cited by the Examiner

UNITED STATES PATENTS

| | | | |
|---|---|---|---|
| 905,329 | 12/1908 | Krause | 242—84.42 |
| 1,151,349 | 9/1915 | Flegel | 242—84.43 |
| 2,445,212 | 7/1948 | Eaby | 242—84.43 |
| 2,564,086 | 8/1951 | Von Beck | 242—84.43 |
| 2,706,096 | 4/1955 | Rufle | 242—158 X |
| 2,927,745 | 3/1960 | Shook | 242—157 X |

MERVIN STEIN, *Primary Examiner.*

B. S. TAYLOR, *Assistant Examiner.*